United States Patent
Lim et al.

(10) Patent No.: US 9,444,670 B2
(45) Date of Patent: Sep. 13, 2016

(54) METHOD AND APPARATUS FOR TRANSMITTING AND RECEIVING SIGNAL BASED ON INTERFERENCE

(71) Applicant: Electronics and Telecommunications Research Institute, Daejeon (KR)

(72) Inventors: Hyoungsoo Lim, Daejeon (KR); Hun Hee Lee, Daejeon (KR); Joungil Yun, Daejeon (KR); Kyu Tae Yang, Daejeon (KR); Young Su Kim, Daejeon (KR); Yun Jeong Song, Daejeon (KR); Namho Hur, Sejong (KR)

(73) Assignee: ELECTRONICS AND TELECOMMUNICATIONS RESEARCH INSTIT, Daejeon (KR)

( * ) Notice: Subject to any disclaimer, the term of this patent is extended or adjusted under 35 U.S.C. 154(b) by 0 days.

(21) Appl. No.: 14/520,176

(22) Filed: Oct. 21, 2014

(65) Prior Publication Data

US 2015/0110219 A1   Apr. 23, 2015

(30) Foreign Application Priority Data

Oct. 21, 2013  (KR) .................. 10-2013-0125530
Oct. 21, 2014  (KR) .................. 10-2014-0142841

(51) Int. Cl.
*H04L 27/26* (2006.01)
*H04K 1/00* (2006.01)

(52) U.S. Cl.
CPC ............. *H04L 27/2626* (2013.01); *H04K 1/00* (2013.01); *H04L 27/2647* (2013.01)

(58) Field of Classification Search
CPC .......... H04L 27/2601; H04L 27/2626; H04L 27/2647; H04L 25/03012; H04L 25/03019; H04L 25/03159; H04L 25/03006; H04L 9/00; H04L 9/12; H04K 1/00
USPC .................. 375/260, 285, 295, 296, 346
See application file for complete search history.

(56) References Cited

U.S. PATENT DOCUMENTS 5,048,057 A * 9/1991 Saleh et al. ................... 375/285
2006/0062321 A1 * 3/2006 Lewis ......................... 375/285

FOREIGN PATENT DOCUMENTS

KR  101070516 B1  9/2011

* cited by examiner

*Primary Examiner* — Betsy Deppe
(74) *Attorney, Agent, or Firm* — William Park & Associates Ltd.

(57) ABSTRACT

A signal transmitting and receiving method and an apparatus for selecting an interference pattern from a security key and transmitting and receiving a signal based on the selected interference pattern are provided.

17 Claims, 9 Drawing Sheets

METHOD AND APPARATUS FOR TRANSMITTING AND RECEIVING SIGNAL BASED ON INTERFERENCE

CROSS-REFERENCE TO RELATED APPLICATION

This application claims priority to and the benefit of Korean Patent Application Nos. 10-2013-0125530 and 10-2014-0142841 filed in the Korean Intellectual Property Office on Oct. 21, 2013 and Oct. 21, 2014, the entire contents of which are incorporated herein by reference.

BACKGROUND OF THE INVENTION (a) Field of the Invention

The present invention relates to a method and apparatus for transmitting and receiving a signal based on interference of the signal.

(b) Description of the Related Art

Generally, in an orthogonal frequency division multiplexing (OFDM) system, a shape and a speed of a pulse are determined in order to transmit a signal in an allowed bandwidth without inter-symbol interference. This is called a Nyquist-based pulse generating method. A pulse determined according to the Nyquist-based pulse generating method may have a maximum transfer rate in a given bandwidth without the inter-symbol interference.

Figure 1:
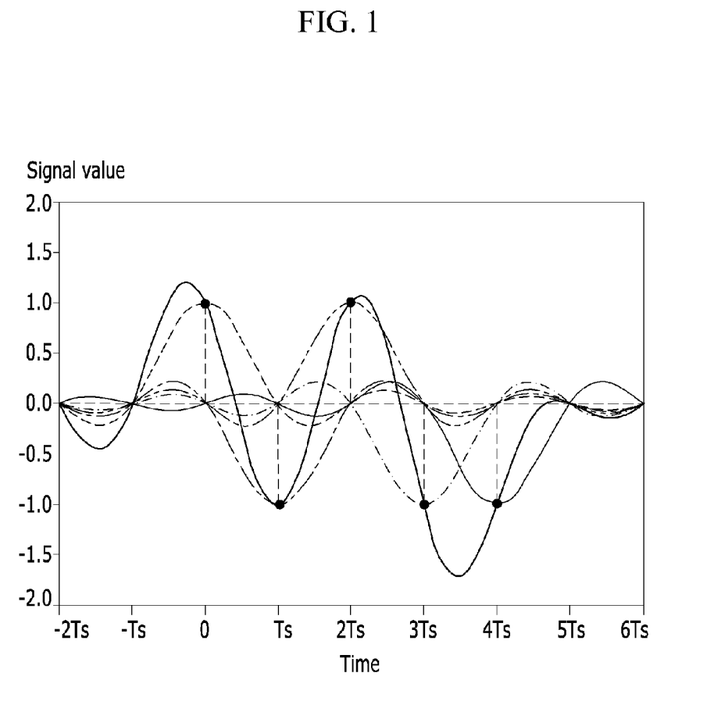
FIG. 1 is a view illustrating a plurality of pulses generated according to a Nyquist-based pulse generating method.

FIG. 1 is a view illustrating a plurality of pulses generated according to the Nyquist-based pulse generating method.

Referring to FIG. 1, each pulse is transmitted without inter-symbol interference. Namely, a currently transmitted symbol is generated according to the Nyquist-based pulse generating method, whereby a generated symbol is transmitted without interfering with preceding and subsequent symbols When it is assumed that a transmitted symbol values are [1, −1, 1, −1, −1], the transmitted signal is denoted by the bold solid line. Namely, the bold solid line signal has the values [1, −1, 1, −1, −1] without inter-symbol interference at times 0, $T_s$, $2T_s$, $3T_s$, $4T_s$. Here, $T_s$ denotes a period between symbols according to the Nyquist-based pluse generating method.

However, the Nyquist-based pulse generating method has a limitation in terms of a transfer rate, and in order to mitigate this problem, a faster than Nyquist (FTN)-type pulse generating method has been introduced. The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for transmitting and receiving a signal having advantages of enhancing security by intentionally causing inter-symbol interference in transmitting a faster than Nyquist (FTN)-type signal.

According to an embodiment of the present invention, a method for transmitting a signal is provided. The method may include: selecting at least one interference pattern from a security key; and transmitting a signal based on the interference pattern.

The security key may include at least one interference pattern, and the interference pattern may be list pattern of transmission parameters.

The selecting may include selecting a first interference pattern of a time domain and a second interference pattern of a frequency domain of the at least one interference pattern.

The transmitting may include transmitting a signal according to transmission parameters listed in the interference pattern.

The transmitting may include overlapping the signal in a time domain according to the interference pattern.

The transmitting may include generating a plurality of subcarriers based on a frequency spacing according to the interference pattern; and transmitting the signal through the plurality of subcarriers.

The transmitting may include generating a plurality of subcarriers based on a frequency spacing according to the second interference pattern; and overlapping the plurality of subcarriers in a time domain according to the first interference pattern.

According to another embodiment of the present invention, method for receiving a signal is provided. The method may include: selecting an interference pattern from a security key; and restoring a bit stream from the received signal based on the interference pattern.

The security key may include at least one interference pattern, and the interference pattern may be list pattern of transmission parameters.

The selecting may include selecting a first interference pattern of a time domain and a second interference pattern of a frequency domain of the at least one interference pattern.

The restoring may include canceling interference from the signal according to transmission parameters listed in the interference pattern.

The restoring may include cancelling an inter-symbol interference of the signal according to the interference pattern.

The restoring may include cancelling an interference between subcarriers from the signal in the basis of frequency spacing based on the interference pattern.

The restoring may include: cancelling an interference of the signal that is overlapped in a time domain in the basis of the first interference pattern; and separating a plurality of subcarriers from the signal in the basis of frequency spacing based on the second interference pattern.

According to another embodiment of the present invention, an apparatus for transmitting a signal is provided. The apparatus may include: an interference pattern controller configured to select an interference pattern from a security key; and a signal transmitter configured to transmit a signal based on the interference pattern.

The security key may include at least one interference pattern, and the interference pattern may be list pattern of transmission parameters.

The interference pattern controller may select a first interference pattern of a time domain and a second interference pattern of a frequency domain of the at least one interference pattern.

The signal transmitter may transmit the signal according to the transmission parameters listed in the interference pattern.

The signal transmitter may overlap the signal in a time domain according to the interference pattern, and may transmit the overlapped signal.

The signal transmitter may generates a plurality of subcarriers based on a frequency spacing according to the interference pattern, and may transmit the signal through the plurality of subcarriers.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may refer to a mobile terminal (MT), a mobile station (MS), an advanced mobile station (AMS), a high reliability mobile station (HR-MS), a subscriber station (SS), a portable subscriber station (PSS), an access terminal (AT), user equipment (UE), or the like, and may include an entirety or a portion of functions of an MT, an MS, an AMS, an HR-MS, an SS, a PSS, an AT, a UE, or the like.

Also, a base station (BS) may refer to an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (ARS) serving as a base station, a high reliability relay station (HR-RS) serving as a base station, small base stations (BSs) (e.g., a femto base station (BS), a home node B (HNB), a home eNodeB (HeNB), a pico BS, a metro BS, a micro BS, etc.), and the like, and may include the entirety or a portion of functions of an ABS, a node B, an eNodeB, an AP, an RAS, a BTS, an MMR-BS, an RS, an RN, an ARS, an HR-RS, a small BS, or the like.

Figure 2:
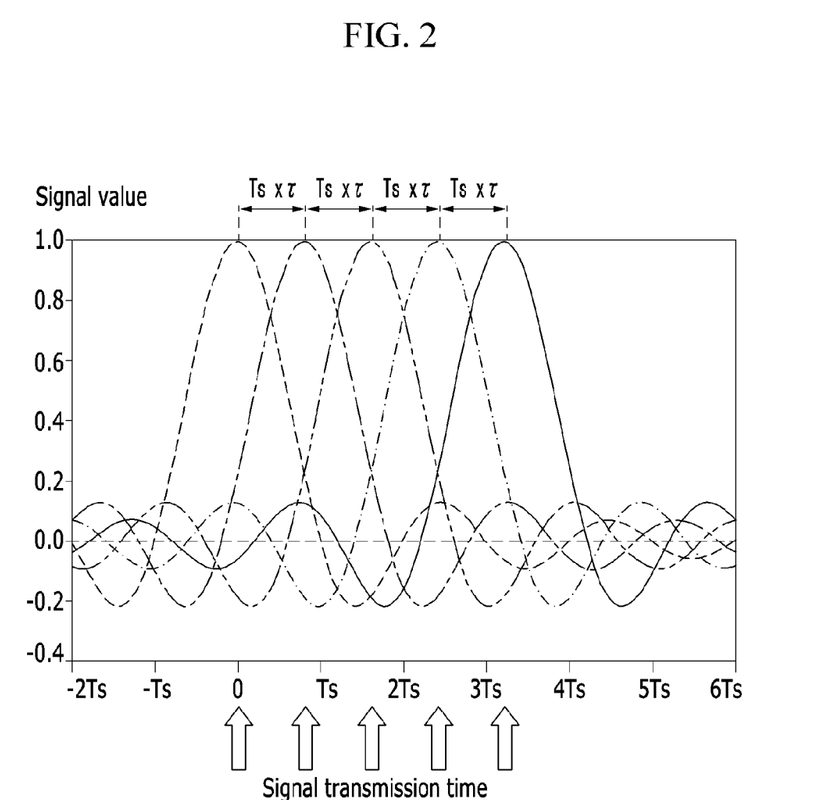
FIG. 2 is a view illustrating faster than Nyquist (FTN)-type pulses according to an embodiment of the present invention.

FIG. 2 is a view illustrating faster than Nyquist (FTN)-type pulses according to an embodiment of the present invention.

Surpassing the conventional Nyquist-based pulse generating method, FIG. 2 is a faster than Nyquist (FTN)-type pulse generating method capable of enhancing a transfer rate without using a wider bandwidth or a higher order modulation. An FTN transmission method according to an embodiment of the present invention shortens a pulse generation period, while maintaining a pulse form given according to bandwidths. In the FTN transmission method according the an embodiment of the present invention, inter-symbol interference is inevitably generated, but a transfer rate in the same bandwidth is increased relative to that of the existing Nyquist-based pulse generating method.

Figure 3:
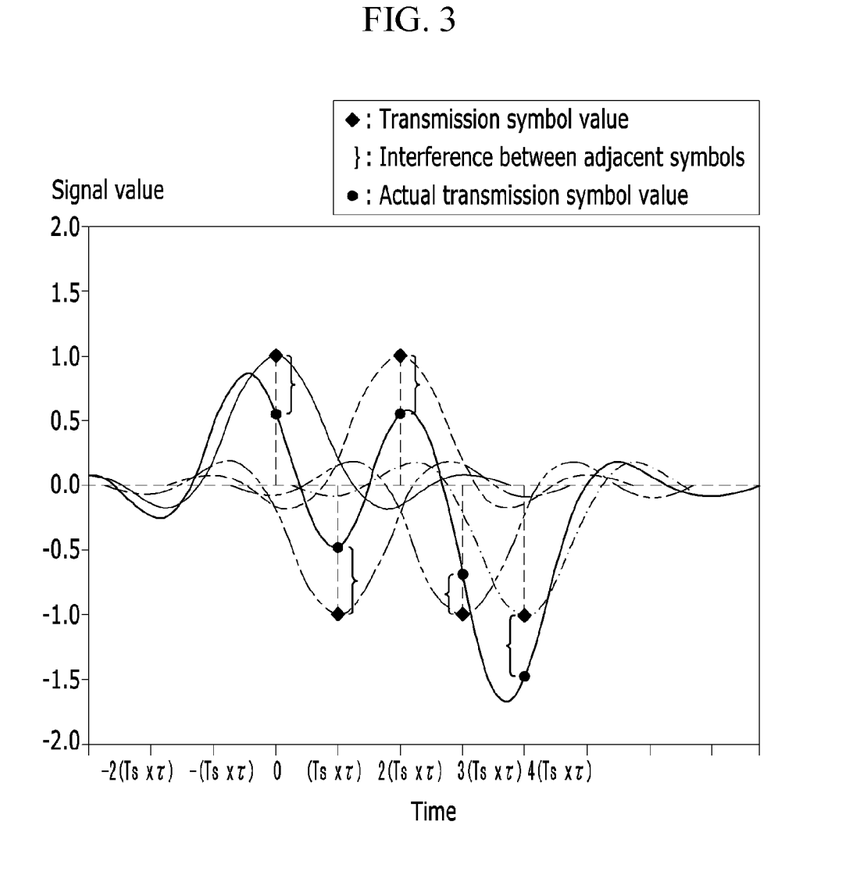
FIG. 3 is a view illustrating a plurality of pulses generated according to an embodiment of the present invention.

FIG. 3 is a view illustrating a plurality of pulses generated according to an embodiment of the present invention.

The FTN-type pulse generating method is a method of transmitting a signal at a period of $\tau \times T_s$ faster than a symbol transmission period ($T_s$) enabling a signal to be transmitted without inter-symbol interference, while maintaining a pulse shape as is. Here, $\tau$ is an FTN transmission parameter, denoting a degree of intentional overlapping symbols and having a value between 0 and 1 ($0<\tau<1$). When $\tau$ is smaller, a transmission speed further increases. For example, when $\tau$ is 0.5, a signal may be transmitted at a speed of twice that of the existing Nyquist method.

Referring to FIG. 3, when the symbol values are [1, −1, 1, −1, −1], symbols are overlapped in the time domain and are transmitted during $4(\tau \times T_s)$ (the bold solid line in FIG. 3). In this case, the inter-symbol interference may be removed in a receiver.

Meanwhile, a method for transmitting and receiving a FTN signal in the time domain according to an embodiment of the present invention may be applied to the frequency domain in the same manner. That is, according to an embodiment of the present invention, the method for transmitting and receiving in the frequency domain may transmit more data at a same bandwidth by transmitting a plurality of subcarriers of OFDM system in a reduced frequency spacing by a ratio of $\tau$ ($0<\tau<1$). In this case, the interference between the subcarriers may be removed in a receiver.

Also, a method for transmitting and receiving an FTN signal according to another embodiment of the present invention may be applied to the time domain and the frequency domain simultaneously. That is, according to the embodiment of the present invention, the method for transmitting and receiving an FTN signal in the time domain according to an embodiment of the present invention may be applied to the FTN symbol including a plurality of subcarriers in which the method for transmitting and receiving an FTN signal in the frequency domain is applied. In this case, an FTN symbol in which the method for transmitting and receiving an FTN signal in the frequency domain is applied is overlapped according to an interference pattern and thus more data may be transmitted in the same time and same bandwidth.

Figure 4A:
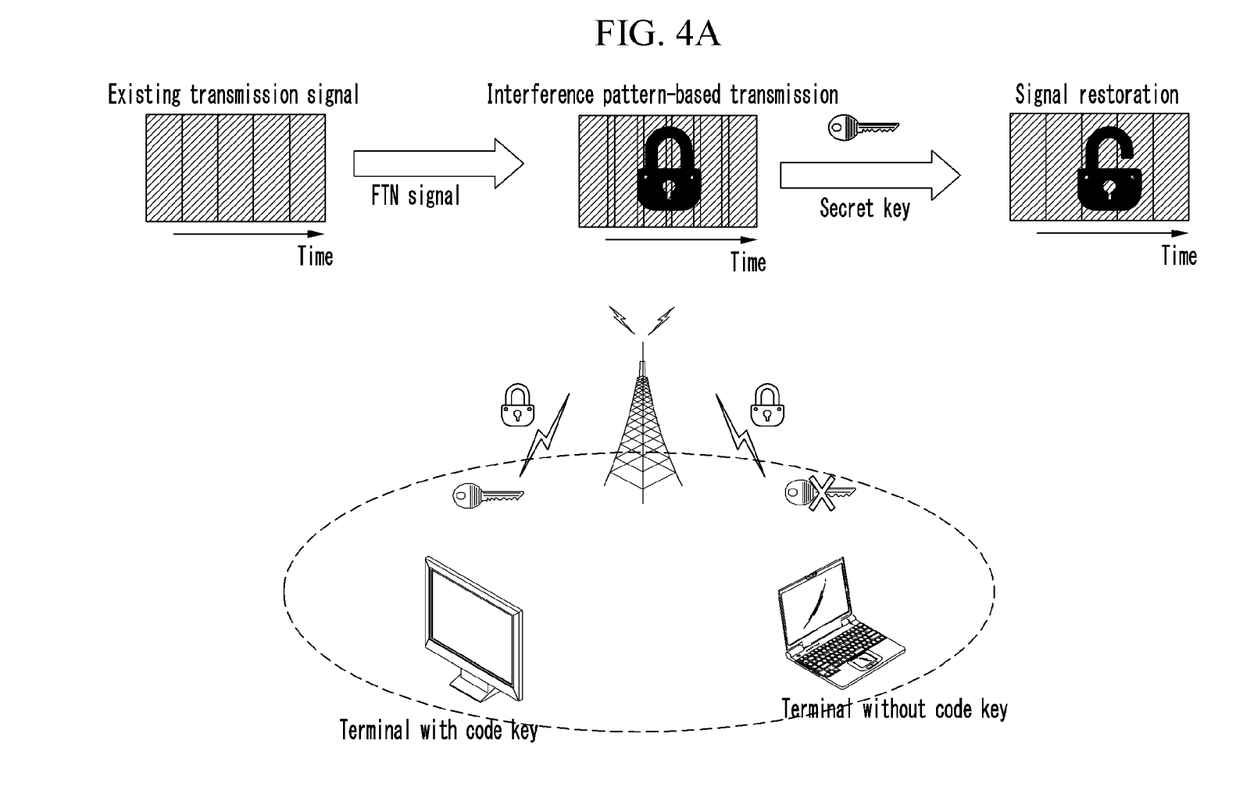
FIG. 4A, FIG. 4B and FIG. 4C are view illustrating a system for transmitting and receiving a signal according to an embodiment of the present invention.
Figure 4B:
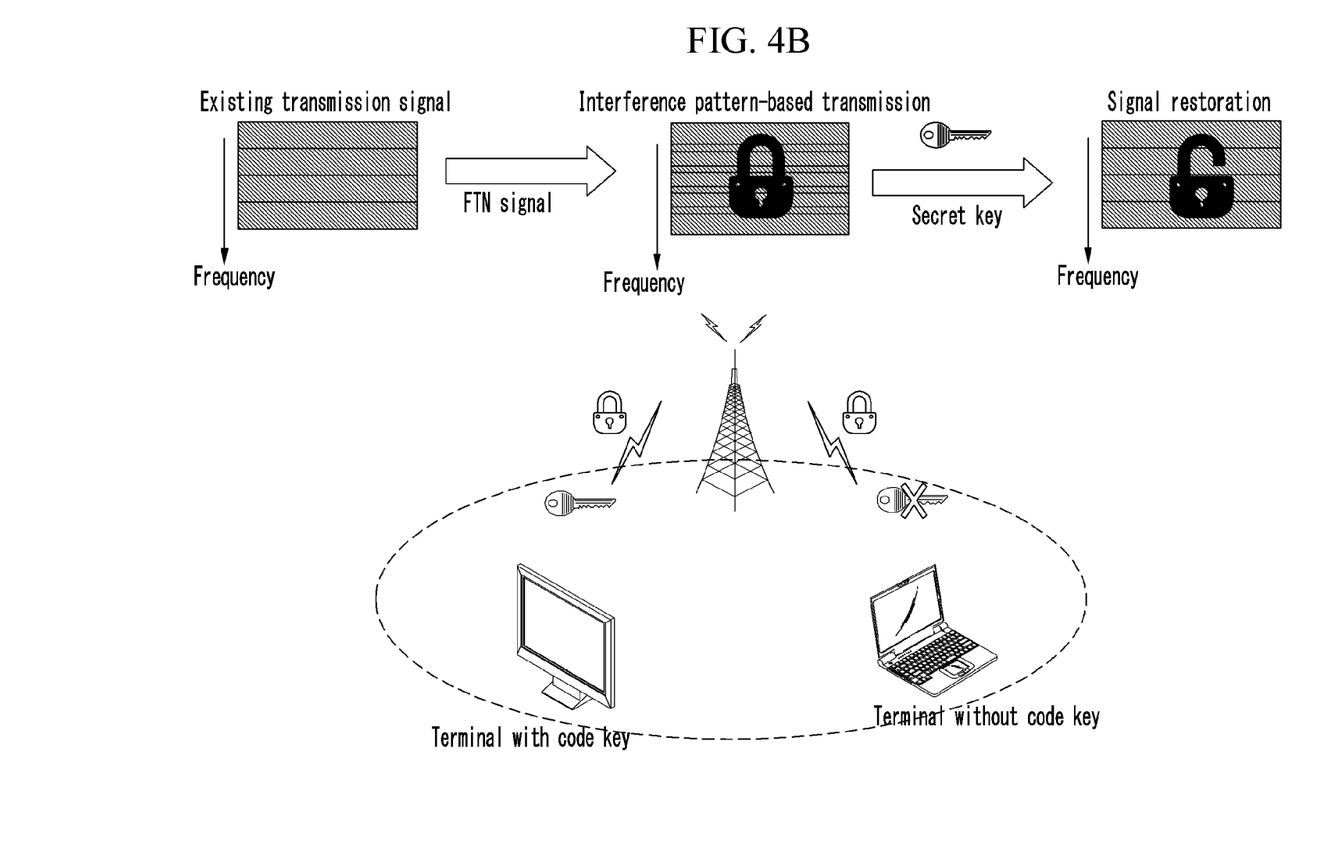
Figure 4C:
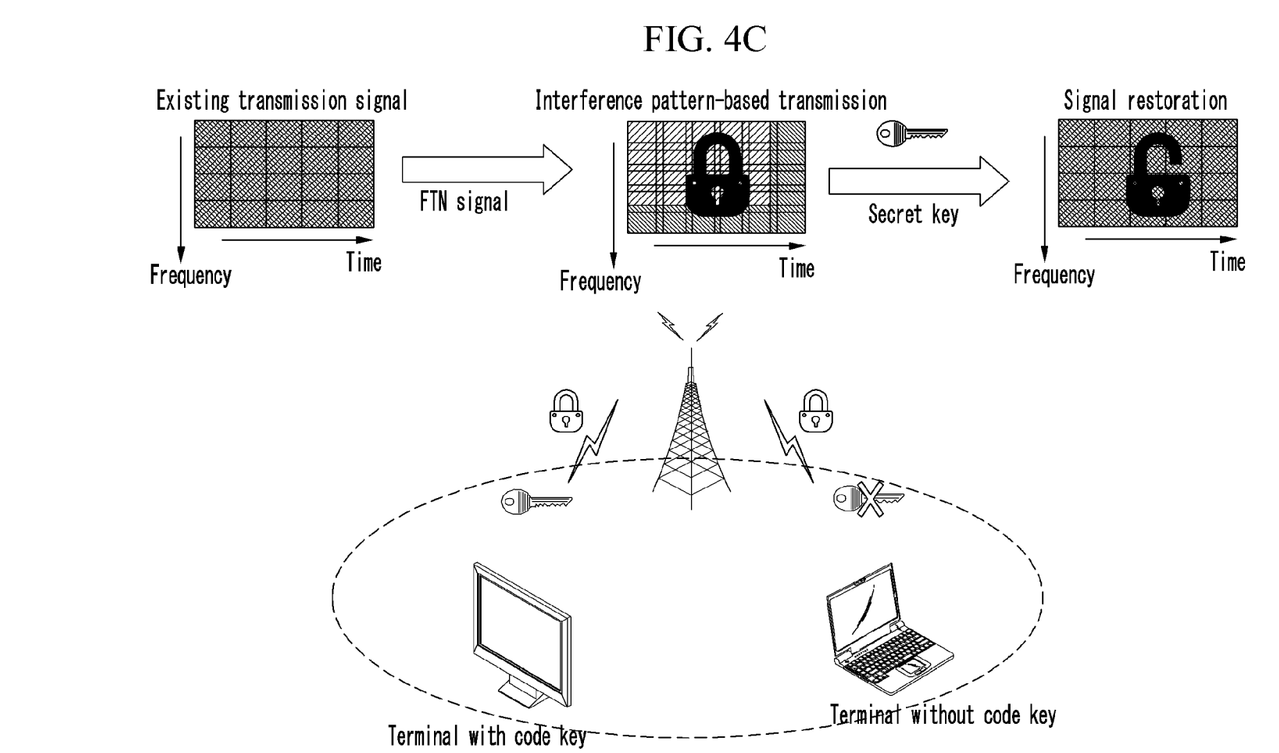

FIG. 4A, FIG. 4B and FIG. 4C are views illustrating systems for transmitting and receiving signals according to embodiments of the present invention.

FIG. 4A is a system for transmitting and receiving an FTN signal in the time domain, FIG. 4B is a system for transmitting and receiving an FTN signal in the frequency domain, and FIG. 4C is a system for transmitting and receiving an FTN signal in the time domain and the frequency domain.

In an exemplary embodiment of the present invention, when a physical layer is security-transmitted using the FTN transmission method, an interference signal is intentionally generated by changing the transmission parameter τ to thus enhance security of a signal.

In FIG. 4A, FIG. 4B and FIG. 4C, a transmitter 100 is a base station and a receiver 200 is a terminal. In certain cases, the base station may perform the receiver 200 and the terminal may perform the transmitter 100. The transmitter 100 may transmit an FTN signal by using an interference pattern selected according to a predetermined security key (namely, an interference pattern code key).

The receiver 200 may restore transmitted data from the received FTN signal using the security key related to the interference pattern. Here, a terminal having the security key may be able to normally restore the signal, but a terminal without the security key cannot restore the signal.

Figure 5:
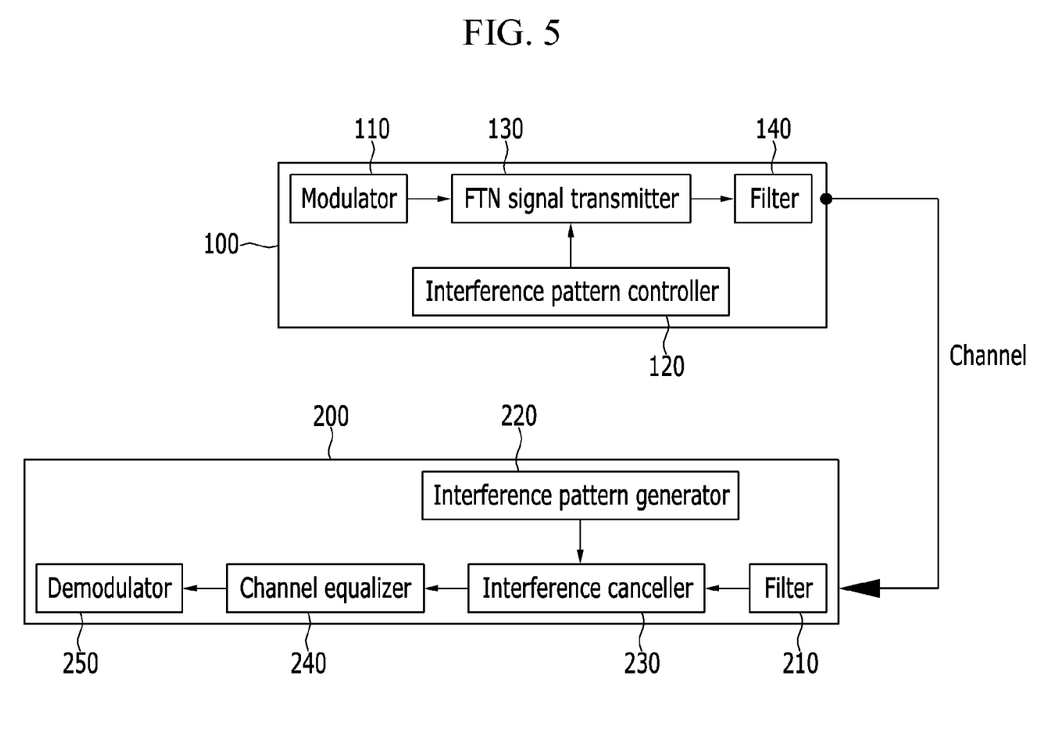
FIG. 5 is a block diagram illustrating a system for transmitting and receiving a signal according to an embodiment of the present invention.

FIG. 5 is a block diagram illustrating a system for transmitting and receiving a signal according to an embodiment of the present invention.

Referring to FIG. 5, the transmitter 100 includes a modulator 110, an interference pattern controller 120, an FTN signal transmitter 130, and filter (140).

The modulator 110 may modulate a bit stream according to phase shift keying (PSK) or quadrature amplitude modulation (QAM). Before being input to the modulator 110, the bit stream may undergo channel coding and interleaving. An existing transmission technique having security, such as a direct sequence spread spectrum (DS-SS), a frequency hopping spread spectrum (FH-SS), a time hopping spread spectrum (TH-SS), or the like, may be additionally applied.

The interference pattern controller 120 may select an inter-symbol interference pattern from a predetermined security key. The security key may include a plurality of inter-symbol interference patterns, and the transmitter 100 and the receiver 200 may share the security key with each other. Also, the plurality of inter-symbol interference patterns included in the security key may include interference pattern of the time domain or an interference pattern of the frequency domain. In this case, the interference patterns may be list patterns (sequences) of the FTN transmission parameter. In the time domain the transmission parameter .tau. may represent a degree of inter-symbol interference, and the transmission parameter .tau. in the frequency domain may represent a degree of interference between the subcarriers.

The FTN signal transmitter 130 may transmit an FTN signal, while changing the value τ by using an inter-symbol interference pattern (interference pattern of the time domain). Also, the FTN signal transmitter 130 may transmit an FTN signal, while changing the value τ by using an interference pattern between the subcarriers (interference pattern of the frequency domain). When the FTN signal transmitter 130 uses the interference pattern of the frequency domain, the FTN signal transmitter 130 may generate a plurality of subcarriers having the frequency spacing according to the interference pattern of the frequency domain, and may transmit the signal through the generated plurality of subcarriers.

The filter 140 may determine a shape of the symbol pulse what constitutes the FTN signal and transmission spectrum.

The receiver 200 includes a filter 210, an interference pattern generator 220, an interference canceller 230, and a demodulator 250.

The filter 210 may filter noise of a received FTN signal.

The interference pattern generator 220 may select an interference pattern from the security key. That is, the interference pattern generator 220 may select an inter-symbol interference pattern, or may select an interference pattern between subcarriers, or may select an inter-symbol interference pattern and an interference pattern between subcarriers from the security key.

Here, the security key is identical to that of the transmitter 100. Thus, if the receiver 200 does not know the security key corresponding to a received signal, the receiver 200 cannot restore a transmitted bit stream because it does not have information regarding an interference pattern regarding the received signal. Also, since changes in symbol timing according to interference patterns are continuously accumulated and relevance between a symbol timing of the received signal and a symbol timing of a receiver without the security key is reduced, it is difficult to restore the transmitted bit stream without the security key.

The interference canceller 230 may cancel interference from the received FTN signal according to the inter-symbol interference pattern, or may cancel interference from the received FTN signal according to the interference patterns between the subcarriers. In the case of the frequency domain coded FTN signaling, the interference canceller 230 may cancel interference from the FTN signal in the basis of the frequency spacing of the interference pattern between the subcarriers. When the interference canceller 230 cancels the interference from the dually overlapped signal in the time domain and the frequency domain, the interference canceller 230 may separate a plurality of subcarriers from the signal in the basis of interference pattern between subcarriers after cancelling the interference of the signal that is overlapped in the time domain in the basis of the inter-symbol interference pattern.

The demodulator 250 demodulates the signal modulated according to PSK, QAM, or the like, to restore the bit stream. Here, the demodulator 250 may perform hard decision making to output a binary bit stream with respect to the input signal, or may perform soft decision making which is continuous or has 2 or more levels. In a case in which the existing transmission technique having security, such as DS-SS, FH-SS, TH-SS, or the like is added to the modulator 110, the technique such as DS-SS, FH-SS, TH-SS, or the like may also be applied to the demodulator 250.

The receiver 200 according to an embodiment of the present invention may further include the channel equalizer 240. The channel equalizer 240 may be located between the filter 210 and the interference canceller 230 or between the interference canceller 230 and demodulator 250, and may compensate for channel distortion such as amplitude distortion, phase distortion, and the like.

Meanwhile, in a case in which channel coding or interleaving has been applied to the bit stream of the transmitter 100, deinterleaving or channel decoding may be applied to the bit stream output from the demodulator 250. In this case, deinterleaving and channel decoding may be applied to a turbo receiver having an iterative loop structure including at least one of the demodulator 250, the interference canceller 230, and the channel equalizer 240.

Figure 6:
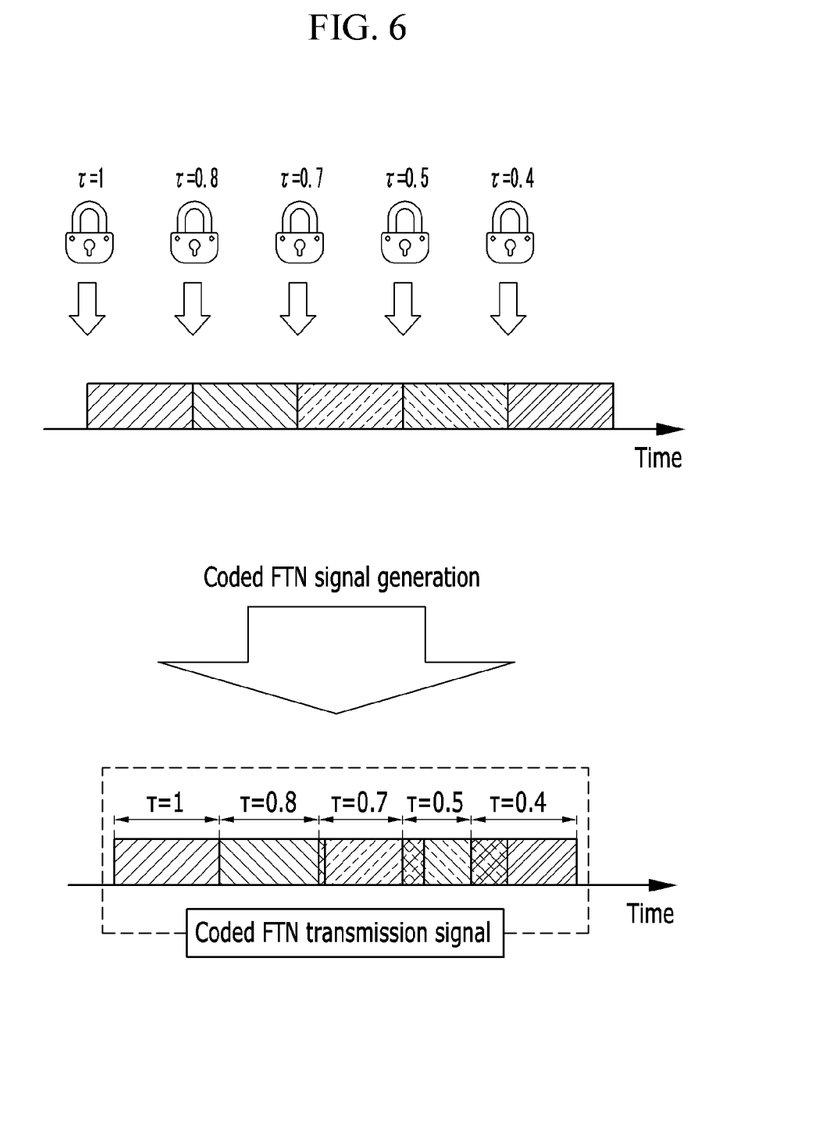
FIG. 6 is a view illustrating a coded FTN signal in the time domain generated according to an embodiment of the present invention.

FIG. 6 is a view illustrating a coded FTN signal in the time domain generated according to an embodiment of the present invention.

Referring to FIG. 6, the interference pattern controller 120 according to an embodiment of the present invention selects τ={1, 0.8, 0.7, 0.5, 0.4} as an inter-symbol interference pattern from a security key. Thereafter, the FTN signal transmitter 130 transmits an FTN signal by using the selected inter-symbol interference pattern.

In FIG. 6, the FTN signal transmitter 130 transmits the second pulse after $T_s$ seconds from the first pulse, and transmits the third pulse after $0.8 \times T_s$ seconds from the second pulse. The FTN signal transmitter 130 transmits the fourth pulse after 0.7×$T_s$ seconds from the third pulse, and transmits the fifth pulse after 0.5×$T_s$ seconds from the fourth pulse. Subsequently, the FTN signal transmitter 130 transmits the sixth pulse after 0.4×$T_s$ seconds from the fifth pulse, and transmits the seventh pulse after $T_s$ seconds from the sixth pulse. Then, as illustrated in FIG. 6, symbols in the signal transmitted from the transmitter 100 are intentionally overlapped. In this case, a degree of inter-symbol interference may vary according to inter-symbol interference patterns of a predetermined security key.

Figure 7:
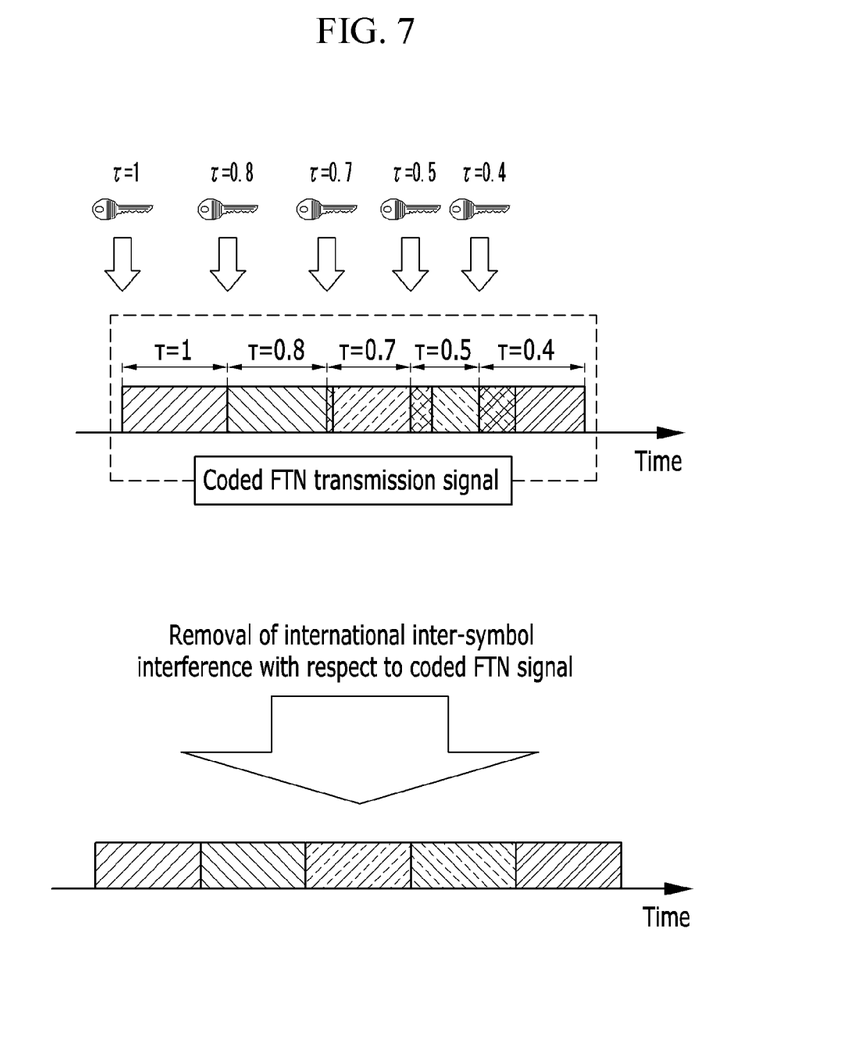
FIG. 7 is a view illustrating a coded FTN signal in the time domain restored in a receiver according to an embodiment of the present invention.

FIG. 7 is a view illustrating a coded FTN signal in the time domain restored in a receiver according to an embodiment of the present invention.

Referring to FIG. 7, the receiver 200 according to an embodiment of the present invention may restore a received FTN signal by applying an inter-symbol interference pattern identical to that of the transmitter 100 thereto. The pattern identical to that of the inter-symbol interference pattern used in the transmitter 100 should be used to accurately cancel interference and restore the bit stream.

According to the embodiment of the present invention as described above, the transmitter transmits a signal using a predetermined inter-symbol interference pattern, and only a receiver that has an interference pattern identical to the interference pattern used in the transmitter can restore a bit stream from a received signal. Namely, only a receiver that accurately knows a security key can restore the bit stream from the signal transmitted from the transmitter.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting a signal, the method comprising:
   selecting at least one interference pattern from a security key; and
   transmitting a signal based on the interference pattern,
   wherein the security key includes at least one interference pattern, and the interference pattern is a list pattern of transmission parameters.

2. The method of claim 1, wherein the selecting comprises selecting a first interference pattern of the time domain and a second interference pattern of the frequency domain of the at least one interference pattern.

3. The method of claim 2, wherein the transmitting comprises generating a plurality of subcarriers based on a frequency spacing according to the second interference pattern, and overlapping the plurality of symbols in the time domain according to the first interference pattern.

4. The method of claim 1, wherein the transmitting comprises transmitting a signal according to transmission parameters listed in the interference pattern.

5. The method of claim 1, wherein the transmitting comprises overlapping a plurality of symbols in the time domain according to the interference pattern.

6. The method of claim 1, wherein the transmitting comprises generating a plurality of subcarriers based on a frequency spacing according to the interference pattern, and transmitting the signal through the plurality of subcarriers.

7. A method for receiving a signal, the method comprising:
   selecting an interference pattern from a security key; and
   restoring a bit stream from the received signal based on the interference pattern,
   wherein the security key includes at least one interference pattern, and the interference pattern is a list pattern of transmission parameters.

8. The method of claim 7, wherein the selecting comprises selecting a first interference pattern of the time domain and a second interference pattern of the frequency domain of the at least one interference pattern.

9. The method of claim 8, wherein the restoring comprises cancelling an interference of the signal that is overlapped in the time domain on the basis of the first interference pattern, and separating a plurality of subcarriers from the signal on the basis of frequency spacing based on the second interference pattern.

10. The method of claim 7, wherein the restoring comprises canceling interference from the signal according to transmission parameters listed in the interference pattern.

11. The method of claim 7, wherein the restoring comprises cancelling an inter-symbol interference of the signal according to the interference pattern.

12. The method of claim 7, wherein the restoring comprises cancelling an interference between subcarriers from the signal on the basis of frequency spacing based on the interference pattern.

13. An apparatus for transmitting a signal, the apparatus comprising:
    an interference pattern controller configured to select an interference pattern from a security key; and
    a signal transmitter configured to transmit a signal based on the interference pattern,
    wherein the security key includes at least one interference pattern, and the interference pattern is a list pattern of transmission parameters.

14. The apparatus of claim 13, wherein the interference pattern controller selects a first interference pattern of the time domain and a second interference pattern of the frequency domain of the at least on interference pattern.

15. The apparatus of claim 13, wherein the signal transmitter transmits the signal according to transmission parameters listed in the interference pattern.

16. The apparatus of claim 13, wherein the signal transmitter overlaps the signal in the time domain according to the interference pattern, and transmits the overlapped signal.

17. The apparatus of claim 13, wherein the signal transmitter generates a plurality of subcarriers based on a frequency spacing according to the interference pattern, and transmits the signal through the plurality of subcarriers.

* * * * *